United States Patent
Shen et al.

(10) Patent No.: US 7,207,000 B1
(45) Date of Patent: Apr. 17, 2007

(54) PROVIDING DYNAMIC WEB PAGES BY SEPARATING SCRIPTS AND HTML CODE

(75) Inventors: HongHai Shen, San Jose, CA (US); Yudong Sun, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 09/512,738

(22) Filed: Feb. 24, 2000

(51) Int. Cl.
G06F 17/21 (2006.01)
G06F 17/24 (2006.01)

(52) U.S. Cl. ............ 715/513; 715/511; 715/512; 715/514; 707/10; 709/203

(58) Field of Classification Search ........ 715/511–514; 707/10; 709/203, 253
See application file for complete search history.

(56) References Cited

U.S. PATENT DOCUMENTS

| | | | |
|---|---|---|---|
| 5,649,186 A | 7/1997 | Ferguson | 395/610 |
| 5,732,219 A | 3/1998 | Blumer et al. | 395/200.57 |
| 5,748,188 A | 5/1998 | Hu et al. | 345/326 |
| 5,778,367 A | 7/1998 | Wesinger, Jr. et al. | 707/10 |
| 5,793,966 A | 8/1998 | Amstein et al. | 395/200.33 |
| 5,835,712 A | 11/1998 | DuFresne | 395/200.33 |
| 5,894,554 A * | 4/1999 | Lowery et al. | 709/203 |
| 6,061,698 A * | 5/2000 | Chadha et al. | 715/513 |
| 6,083,276 A * | 7/2000 | Davidson et al. | 717/107 |
| 6,145,119 A | 11/2000 | House et al. | |
| 6,151,623 A * | 11/2000 | Harrison et al. | 709/206 |
| 6,430,624 B1 * | 8/2002 | Jamtgaard et al. | 709/246 |
| 6,463,352 B1 * | 10/2002 | Tadokoro et al. | 700/169 |
| 6,519,617 B1 * | 2/2003 | Wanderski et al. | 715/513 |
| 6,538,673 B1 * | 3/2003 | Maslov | 345/853 |
| 6,542,912 B2 * | 4/2003 | Meltzer et al. | 715/501.1 |
| 6,578,192 B1 * | 6/2003 | Boehme et al. | 717/115 |
| 6,643,652 B2 * | 11/2003 | Helgeson et al. | 707/10 |
| 6,701,485 B1 * | 3/2004 | Igra et al. | 715/503 |
| 6,721,747 B2 * | 4/2004 | Lipkin | 707/10 |
| 6,748,569 B1 * | 6/2004 | Brooke et al. | 715/523 |

FOREIGN PATENT DOCUMENTS

| | | |
|---|---|---|
| EP | 0 818 742 A1 | 1/1998 |
| GB | 2 329 309 A | 3/1999 |

(Continued)

OTHER PUBLICATIONS

U.S. Appl. No. 60/176,137.*

(Continued)

*Primary Examiner*—Stephen Hong
*Assistant Examiner*—Joshua D. Campbell
(74) *Attorney, Agent, or Firm*—Sughrue Mion, PLLC

(57) ABSTRACT

A request reception module receives a request for an document stored within document server. A parsing module parses the requested document to generate therefrom a corresponding document object model (DOM) including at least one object. An instruction obtaining module obtains a transformation instruction directed to a first object of the DOM. An object transformation module transforms the first object in accordance with the transformation instruction. A flattening module flattens the DOM to generate therefrom a corresponding transformed document. A transmission module transmits the transformed document to a requesting client program.

54 Claims, 12 Drawing Sheets

FOREIGN PATENT DOCUMENTS

JP  1-139329 A  5/1989
WO  98/14896  4/1998

OTHER PUBLICATIONS

Research Disclosure Mar. 1999 / 383 Dynamic Parameter Setting for CICS* Web Interface.

Data-Intensive Intra- and Internet Applications; Authors—Jurgen. Sellentin and Bernhard Mitschang.

Dr. Dobb's Journal V.24, N.6, pp. 64,66,68-72, Jun. 1999, Extensibility in Tcl; Author —John Ousterhout.

Digital Systems; Generating Dynamic Documents from Templates: ideal for common gateway interfaces by Chenna Ramu.

Research Disclosure—415119 Nov. 10, 1998 Method for Embedding HTMLS In Web Page . . .

HPP: HTML Marco-Preprocessing to Support Dynamic Document Caching* Fred Douglis AT&T Labs-Research Douglis, et al.

* cited by examiner

File: personalinfo.asp

```
<html>
<head>
<title>Personal Information Update</title>
</head>
<body>
<table>
<form action="update.asp" method="post">
<tr>
<td>Name:</td>
<td>
<% Response.Write("<input name='name' value='"
     & rs("name") & "'>" ) %>
</td>
</tr>
<tr>
<td>Phone:</td>
<td>
<% Response.Write("<input name='phone' value='"
     & rs("phone") & "'>" ) %>
</td>
</tr>
<tr>
<td>E-mail:</td>
<td>
<% Response.Write("<input name='email' value='"
     & rs("email") & "'>" ) %>
</td>
</tr>
<td colspan="2" aling="center">
<input type="Submit" name="Submit" value="Submit">
</td>
</tr>
</form>
</table>
</body>
</html>
```

Fig. 1
(prior art)

Personal Information Update

Name:

Phone:

E-mail:

**Fig. 2
(prior art)**

Personal Information Update

Name: Jane Doe

Phone: 408-555-1234

E-mail: JaneDoe@IBM.COM

Submit

**Fig. 4
(prior art)**

File: personalinfo.html

```
<html>
<head>
<title>Personal Information Update</title>
</head>
<body>
<table>
<form action="update.asp" method="post">
<tr>
<td>Name:</td>
<td>
                                                    6A
<input name='name' value='Jane Doe'>
</td>
</tr>
<tr>
<td>Phone:</td>
<td>
                                                    6B
<input name='phone' value='408-555-1234'>
</td>
</tr>
<tr>
<td>E-mail:</td>
<td>
                                                    6C
<input name='email' value='JaneDoe@IBM.COM'>
</td>
</tr>
<td colspan="2" aling="center">
<input type="submit" name="submit" value="submit">
</td>
</tr>
</form>
</table>
</body>
</html>
```

Fig. 3
(prior art)

File: personalinfo.html

```
<html>
<head>
<title>Personal Information Update</title>
</head>
<body>
<table>
<form action="update.asp" method="post">
<tr>
<td>Name:</td>
<td>
<input name='name' value=''>
</td>
</tr>
<tr>
<td>Phone:</td>
<td>
<input name='phone' value=''>
</td>
</tr>
<tr>
<td>E-mail:</td>
<td>
<input name='email' value=''>
</td>
</tr>
<td colspan="2" aling="center">
<input type="submit" name="submit" value="submit">
</td>
</tr>
</form>
</table>
</body>
</html>
```

Fig. 8

```
                File: personalinfo.html

<html>
    <head>
    <title>Personal Information Update</title>
    </head>
    <body>                                                    ~86
    <table>
    <form action="update.asp" method="post">
    <tr>
    <td>Name:</td>
    <td>                                              6A
    ┌──────────────────────────────────────────────┐
    │ <input name='name' value='Jane Doe'>         │
    └──────────────────────────────────────────────┘
    </td>
    </tr>
    <tr>
    <td>Phone:</td>
    <td>                                              6B
    ┌──────────────────────────────────────────────┐
    │ <input name='phone' value='408-555-1234'>    │
    └──────────────────────────────────────────────┘
    </td>
    </tr>
    <tr>
    <td>E-mail:</td>
    <td>                                              6C
    ┌──────────────────────────────────────────────┐
    │ <input name='email' value='JaneDoe@IBM.COM'> │
    └──────────────────────────────────────────────┘
    </td>
    </tr>
    <td colspan="2" aling="center">
    <input type="submit" name="submit" value="submit">
    </td>
    </tr>
    </form>
    </table>
    </body>
    </html>
```

Fig. 14

Personal Information Update

Name: Jane Doe

Phone: 408-555-1234

E-mail: JaneDoe@IBM.COM

Submit

PROVIDING DYNAMIC WEB PAGES BY SEPARATING SCRIPTS AND HTML CODE

BACKGROUND OF THE INVENTION

Field of the Invention

The present invention relates generally to programming techniques in the hypertext markup language ("HTML"). More particularly, the present invention relates to a system and method for providing dynamic Web pages by separating scripts and HTML code.

Identification of Copyright

A portion of the disclosure of this patent document contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Relevant Technology

The World Wide Web (hereinafter "the Web") is a collection of Internet-accessible servers from which specially formatted documents may be retrieved and displayed by Web browsers, such as Netscape Navigator™ and Microsoft Internet Explorer™. Currently, the hypertext markup language ("HTML") is the most common authoring language for creating Web documents, also known as "Web pages." A Web page is identified by a uniform resource locator ("URL"), which is used by a Web browser to locate and display a particular Web page.

Until recently, most Web pages were static, i.e. the content of a Web page was the same each time it was displayed. As a result, to produce customized content for different users, for example, different Web pages (with different URLs) were created in advance for each user. Such an approach has obvious shortcomings, however, since a Web server would need to store millions of different Web pages for millions of different users.

Consequently, techniques were developed to make Web pages dynamic, i.e. the content of a single Web page may change each time it is viewed. A different Web page may be displayed depending, for example, on the identity of the reader, the geography of the reader, the time of day, previous pages viewed by the reader, and the like.

For instance, a user may retrieve a Web page containing her bank account balance. However, the bank does not typically store individual "account balance" pages for each user. Instead, user-specific information is retrieved from the bank's database and dynamically inserted into a Web page template, after which the resulting Web page is sent to the user's Web browser.

Conventionally, dynamic Web pages are created by embedding server-side scripts in Web pages, which execute on a Web server and generate HTML elements prior to the Web page being sent to a browser. A variety of technologies exist for producing dynamic HTML pages, including common gateway interface ("CGI") scripts, active server pages ("ASP"), server-side includes ("SSI"), cookies, Java, JavaScript, and ActiveX.

Unfortunately, embedding server-side scripts within Web pages has at least two major drawbacks that have plagued Web page developers and HTML programmers. First, a Web page including embedded scripts cannot be effectively edited with an interactive HTML editor, because some of the HTML elements of the page are only generated by the scripts at run time, and are thus unknown to the editor at design time.

Second, Web documents including embedded scripts are often difficult to maintain and debug since the scripts are typically scattered throughout a Web page at various locations at which corresponding HTML elements are to be inserted by a Web server. This fact also makes it difficult to provide a high-level integrated development environment ("IDE") for script writers and programmers.

The above-described problems are more fully illustrated by the following example. A user may wish to update her personal information on an e-commerce site, such as Amazon.com™. Accordingly, she may request a dynamic Web page adapted for that purpose by clicking on a corresponding button displayed by her Web browser.

FIG. 1 depicts a conventional dynamic Web page 2 for updating a user's personal information. As illustrated, the Web page 2 includes a number of embedded scripts 4. The Web page 2 may be an active server page ("ASP"), as shown, although other technologies could be used.

In general, the embedded scripts 4 are unintelligible to Web browsers and HTML editors. As such, if the Web page 2 of FIG. 1 is displayed by a standard Web browser or HTML editor, the scripts will be ignored, and a displayed page 2 similar to that of FIG. 2 will result.

Conventionally, the Web server handling the request modifies the Web page 2 by replacing the scripts 4 of FIG. 1 with the output of the script execution (e.g., the Write( ) arguments). Typically, the output includes one of more HTML elements 6, as illustrated in FIG. 3. Thereafter, a "modifies" Web page 8 may be sent to the requesting Web browser.

For instance, the Web server may replace the script 4A of FIG. 1, i.e. <% Response.Write("<input name='name' value='" & rs("name") & "'>") %>, with the HTML element 6A of FIG. 3, i.e. <input name='name'value='Jane Doe'>. The rs ("name") argument is a database query that returns, for example, the user's name, i.e. "Jane Doe."

The modified Web page 8, as displayed by a Web browser, is shown in FIG. 4. As a result of the above-described process, a single requested Web page 2 may produce customized output for different users. In other words, the Web page 2 is "dynamic."

Unfortunately, conventional dynamic Web pages 2 of the type illustrated in FIG. 1 have numerous drawbacks. As previously noted, a Web page 2 including embedded scripts 4 cannot be effectively edited by an HTML editor, because some HTML elements 6 do not exist until after the scripts 4 are executed, and are thus not available to the HTML editor at design time.

For example, the HTML element 6A, i.e. <input name='name'value='Jane Doe'>, does not exist in the Web page 2 of FIG. 1. The element 6A is not added until after the Web server executes the script 4A. As a result, a Web designer is limited to the displaying and editing the incomplete Web page 2 of FIG. 2, rather than the completed Web page 2 of FIG. 4. Designing and laying out a Web page 2 is understandably difficult when some of the HTML elements 6 are not available at design time.

Moreover, debugging and maintaining conventional dynamic Web pages 2 are difficult, since individual scripts 4 are scattered throughout the pages 2 at various locations dictated by the insertion points of corresponding HTML elements 6. For instance, the Web page 2 of FIG. 1 includes three different scripts 4A–C at three different locations. Larger Web pages 2 may include hundreds of scripts. The lack of a single location in which a Web designer may look to find all of the embedded scripts 4 is a serious problem in Web page development.

Accordingly, what is needed is a system and method for providing dynamic Web pages. What is also needed is a system and method for providing dynamic Web pages that may be edited by an interactive HTML editor. What is also needed is a system and method for providing dynamic Web pages by separating scripts and HTML code.

SUMMARY OF THE INVENTION

The present invention solves many or all of the foregoing problems by introducing a novel system and method for providing dynamic Web pages by separating scripts and HTML code.

In one aspect of the invention, a request reception module may receive a request for a document stored within a document server. The document may be encoded in the hypertext markup language (HTML) and may include one or more HTML elements.

After the request is received, a parsing module may parse the requested document to generate therefrom a corresponding document object model (DOM) including at least one object. Each HTML element of the document typically corresponds to one DOM object.

After the document is parsed, an instruction obtaining module may obtain a transformation instruction directed to at least one object of the DOM. A variety of transformation instructions are possible. For example, one transformation instruction may retrieve a value from a database and assign the value to a DOM object. Another transformation instruction may replace one object with a different object.

In another aspect of the invention, the instruction obtaining module may include a script file access module, which may read a transformation instruction from a script file corresponding to the requested document. In one embodiment, the script file, including one or more transformation instructions, may be included within a separate portion of the document. For example, the HTML elements of the document and the transformation instructions of the script file may be stored within separate portions of a single logical data file. In another embodiment, however, the script file and the document may comprise logically separate data files.

After the transformation instruction is obtained, an object transformation module may transform the first object in accordance with the transformation instruction. Thereafter, a flattening module may flatten the DOM to generate therefrom a corresponding transformed document.

In one embodiment, the transformed document may comprise one or more HTML elements corresponding to the objects of the DOM. As a result of the flattening process, any transformation of a DOM object is preferably reflected within a corresponding HTML element of the transformed document.

In yet another aspect of the invention, a transmission module may transmit the transformed document to a requesting client program. In various embodiments, the client program may include a standard Web browser.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention is more fully disclosed in the following specification, with reference to the accompanying drawings, in which:

FIG. 1 is an illustration of a Web document;

FIG. 2 is an illustration of a screen display produced by a Web browser;

FIG. 3 is an illustration of a Web document;

FIG. 4 is an illustration of a screen display produced by a Web browser;

FIG. 8 is an illustration of a Web document according to an embodiment of the invention;

FIG. 14 is an illustration of a Web document according to an embodiment of the invention; and FIG. 15 is an illustration of a screen display generated by a Web browser according to an embodiment of the invention.

DETAILED DESCRIPTION OF THE PREFERRED EMBODIMENTS

Certain presently preferred embodiments of the invention are now described with reference to the Figures, where like reference numbers indicate identical or functionally similar elements. The components of the present invention, as generally described and illustrated in the Figures, may be implemented in a variety of configurations. Thus, the following more detailed description of the embodiments of the system and method of the present invention, as represented in the Figures, is not intended to limit the scope of the invention, as claimed, but is merely representative of presently preferred embodiments of the invention.

Throughout the following description, various system components are referred to as "modules." In certain embodiments, the modules may be implemented as software, hardware, firmware, or any combination thereof.

For example, as used herein, a module may include any type of computer instruction or computer executable code located within a memory device and/or transmitted as electronic signals over a system bus or network. An identified module may include, for instance, one or more physical or logical blocks of computer instructions, which may be organized as an object, a procedure, a function, or the like.

The identified modules need not be located physically together, but may include disparate instructions stored at different memory locations, which together implement the described logical functionality of the module. Indeed, a module may include a single instruction, or many instructions, and may even be distributed among several discrete code segments, within different programs, and across several memory devices.

Figure 5:
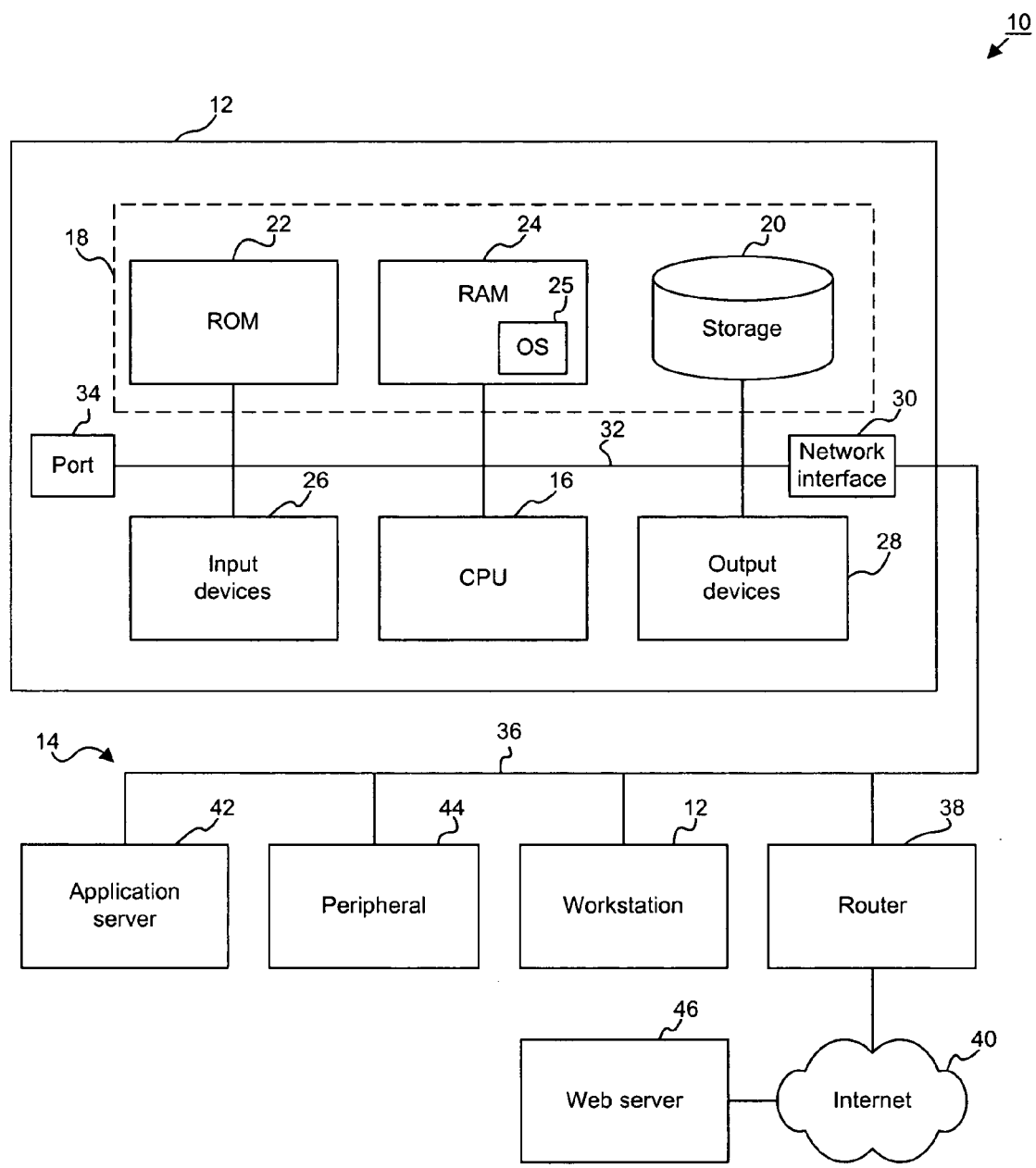
FIG. 5 is a schematic block diagram of a computer system suitable for hosting a plurality of software modules according to an embodiment of the invention.

FIG. 5 is a schematic block diagram illustrating a computer system 10 in which a plurality of software modules may be hosted on one or more computer workstations 12 connected via a network 14. The network 14 may include a wide area network (WAN) or local area network (LAN) and may also include an interconnected system of networks, one particular example of which is the Internet.

A typical computer workstation 12 may include a central processing unit (CPU) 16. The CPU 16 may be operably connected to one or more memory devices 18. The memory devices 18 are depicted as including a non-volatile storage device 20 (such as a hard disk drive or CD-ROM drive), a read-only memory (ROM) 22, and a random access memory (RAM) 24.

The computer workstation 12 may operate under the control of an operating system (OS) 25, such as OS/2®, WINDOWS NT®, WINDOWS®, UNIX®, and the like. In various embodiments, the OS 25 provides a graphical user interface (GUI).

The computer workstation 12 may also include one or more input devices 26, such as a mouse and/or a keyboard, for receiving inputs from a user. Similarly, one or more output devices 28, such as a monitor and/or a printer, may be provided within, or be accessible from, the computer workstation 12.

A network interface 30, such as an Ethernet adapter, may be provided for coupling the computer workstation 12 to the network 14. Where the network 14 is remote from the computer workstation 12, the network interface 30 may include a modem, and may connect to the network 14 through a local access line, such as a telephone line.

Within any given computer workstation 12, a system bus 32 may operably interconnect the CPU 16, the memory devices 18, the input devices 26, the output devices 28, the network interface 30, and one or more additional ports 34, such as parallel and/or serial ports.

The system bus 32 and a network backbone 36 may be regarded as data carriers. Accordingly, the system bus 32 and the network backbone 36 may be embodied in numerous configurations, such as wire and/or fiber optic lines, as well as electromagnetic communication channels using visible light, infrared, and radio frequencies.

The computer workstations 12 may be coupled via the network 14 to application servers 42, and/or other resources or peripherals 44, such as scanners, fax machines, and the like. External networks, such as the Internet 40, may be coupled to the network 14 through a router 38 or firewall.

In various embodiments, one or more Web servers 46 may be accessible to the workstations 12 via the Internet 40. A Web server 46 is a computer system, such as a workstation 12, including specialized software for delivering (serving) Web pages to Web browsers. A variety of Web server application programs are available, including public domain software from NCSA and Apache, as well as commercial packages from Microsoft, Netscape and others.

Figure 6:
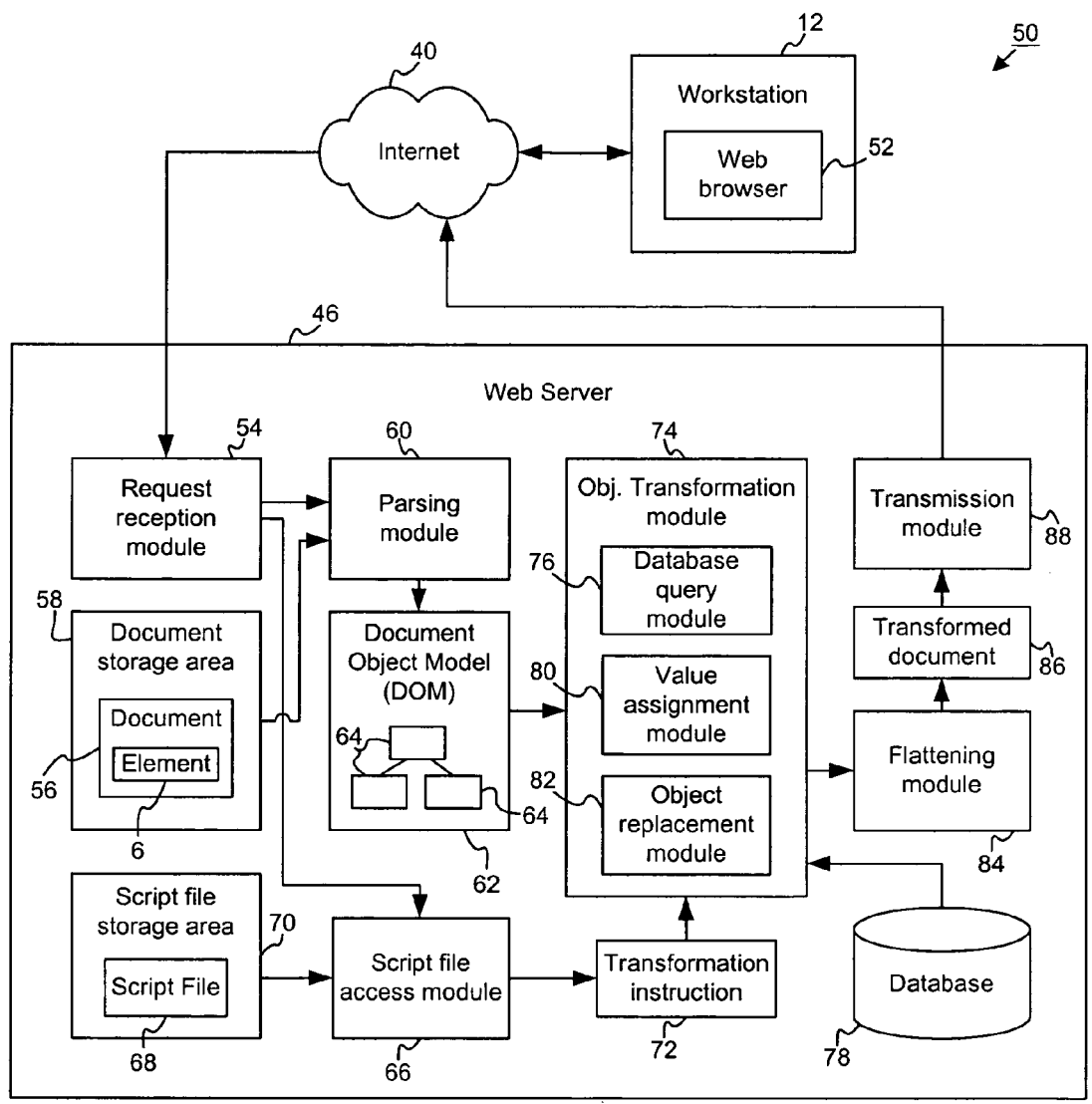
FIG. 6 is a schematic block diagram of a system for providing dynamic Web pages according to an embodiment of the invention.

Referring now to FIG. 6, a system 50 for providing dynamic Web pages according to a presently preferred embodiment of invention may include a workstation 12 and a Web server 46. The workstation 12 may include a conventional Web browser 52, such as Netscape Navigator™ or Microsoft Internet Explorer™, which is capable of communicating with the Web server 46 using the hypertext transfer protocol ("HTTP").

The Web server 46 is depicted as including a request reception module 54. In one embodiment, the request reception module 54 receives (from the Web browser 52) a request for a document 56 stored within a document storage area 58 of the Web server 46. The document 56 may be encoded in the hypertext markup language ("HTML") and may include one or more HTML elements 6, as described more fully hereafter.

In one embodiment, the Web server 46 also includes a parsing module 60, commonly referred to as a "parser." The parsing module 60 retrieves, in various embodiments, the requested document 56 and parses the document 56 to generate therefrom a corresponding Document Object Model (DOM) 62, sometimes referred to as a "parse tree." A DOM 62 is a tree-like, hierarchical data structure including one or more objects 64 that represent the various HTML elements 6 of the document 56.

In certain embodiments, the parsing module 60 is a conventional HTML parser. For example, both Netscape Navigator™ and Microsoft Internet Explorer™ include HTML parsers, which may be adapted, in various embodiments, for use within the Web server 46. In an alternative embodiment, a custom HTML parser may be used. Conventionally, however, a Web server 46 does not include a parsing module 60, since a document 56 is normally parsed only by a Web browser 52 at the time the document 56 is displayed.

The Web server 46 may also include a script file access module 66. In certain embodiments, the script file access module 66 may be configured to retrieve a script file 68 (from a script file storage area 70) corresponding to the requested document 56, as explained more fully hereafter.

A script file 68 may contain one or more transformation instructions 72 or "scripts." However, unlike the conventional server-side scripts 4 of FIG. 1, each transformation instruction 72 is directed to at least one object 64 of the DOM 62 and includes at least one transformation to be performed on the at least one object 64.

For example, as described in greater detail below, one transformation instruction 72 may query a database for a value and assign the value to an object 64 of the DOM 62. Another transformation instruction 72 may replace one object 64 with a different object 64. A wide variety of transformation instructions 72 are possible within the scope of the invention. A transformation instruction 72 may have any suitable syntax, so long as it identifies at least one object 64 and at least one transformation.

In the depicted embodiment, the script files 68 and the Web documents 56 comprise logically separate data files, and may even be housed within separate storage areas 58, 70 of the Web server 46. In such an embodiment, a document 56 and a corresponding script file 68 may have identical or similar names, with the exception of a file extension or other delimiter. For example, if the requested document 56 is named "personalinfo.html," the corresponding script file 68 may be named "personalinfo.scr" or the like. Thus, in various embodiments, the request reception module 54 may identify a corresponding script file 68 for any requested document 56.

In an alternative embodiment, the Web browser 52 may request a script file 68, and the request reception module 54 may identify a corresponding document 56 in like manner. In one embodiment, the script file 68, including one or more transformation instructions 72, may be included within a separate portion of the document 56. For example, the HTML elements 6 of the document 56 and the transformation instructions 72 of the script file 68 may be stored within separate portions of a single logical data file.

In certain presently preferred embodiments, the Web server 46 also includes a object transformation module 74, which may transform one or more objects 64 of the DOM 62 in accordance with the transformation instruction(s) 72 of a corresponding script file 68. In various embodiments, the object transformation module 74 may retrieve each instruction 72 from the script file 68, in sequence, and performs the requested transformation(s).

In the depicted embodiment, the object transformation module 74 includes a number of supplemental modules for performing various transformation instructions 74. For example, a database query module 76 may be provided for performing a specified query on a database 78 to retrieve a value. Likewise, a value assignment module 80 may be provided for assigning a value to a DOM object 64. Moreover, an object replacement module 82 may be provided to replace one object 64 of the DOM 62 with another object 64.

The Web server 46 may also include a flattening module 84. In various embodiments, the flattening module 84 flattens the DOM 62 to generate therefrom a transformed document 86. As used herein, the term "flattening" refers to a process of converting the DOM 62 back into an equivalent HTML document 86 including one or more corresponding HTML elements 6. Techniques for flattening a DOM 62 are well known in the art. The resulting document 86 is designated as "transformed" because any transformations of the DOM objects 64 are preferably reflected in the corresponding HTML elements 6 of the transformed document 86.

In various embodiments, the Web server 46 may also include a transmission module 88. The transmission module 88 may send the transformed document 86 (via the Internet 40) to the Workstation 12, such that the document 86 may be displayed by the Web browser 52.

Figure 7:
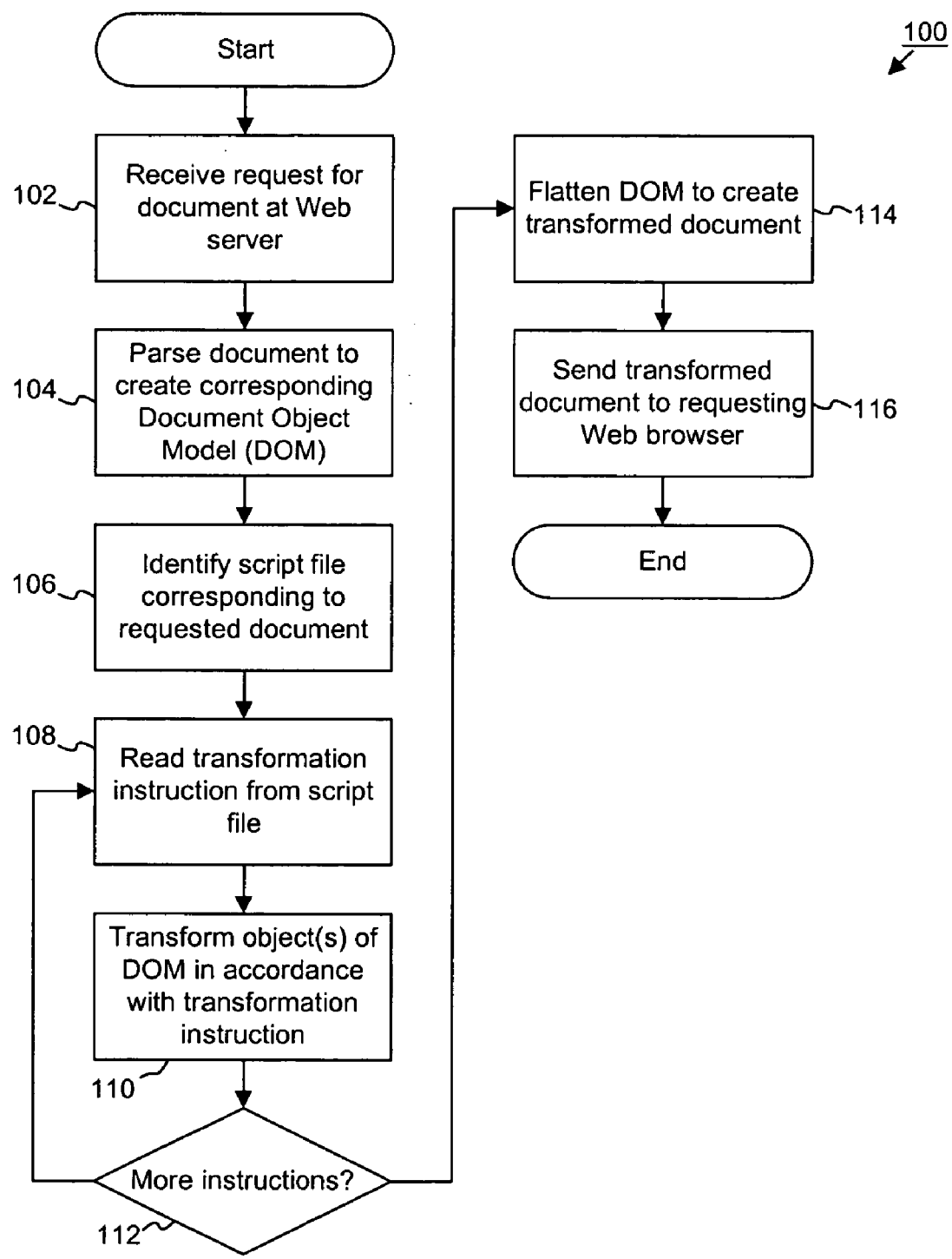
FIG. 7 is a schematic flowchart of a method for providing dynamic Web pages according to an embodiment of the invention.

Referring now to FIG. 7, a schematic flowchart includes a method 100 for providing dynamic Web pages according to a presently preferred embodiment of the invention. The method 100 may begin by receiving 102, at a Web server 46, a request for a document 56.

FIG. 8 illustrates an exemplary document 56 according to an embodiment of the invention. For purposes of comparison, the document 56 may be configured, like the Web page 2 of FIG. 1, to update a user's personal information on an e-commerce site, such as Amazon.com™. However, unlike the Web page 2 of FIG. 1, the document 56 need not include conventional embedded scripts 4.

For example, rather than including a script 4A, as in FIG. 1, a regular HTML element 6D, i.e. <input name='name' value=' '>, may be used. As illustrated, the element 6D may be similar to the element 6A of FIG. 3 (which was inserted by the Web server after executing the script 4A), except that the "value" attribute may be left empty.

Figures 9, 10:
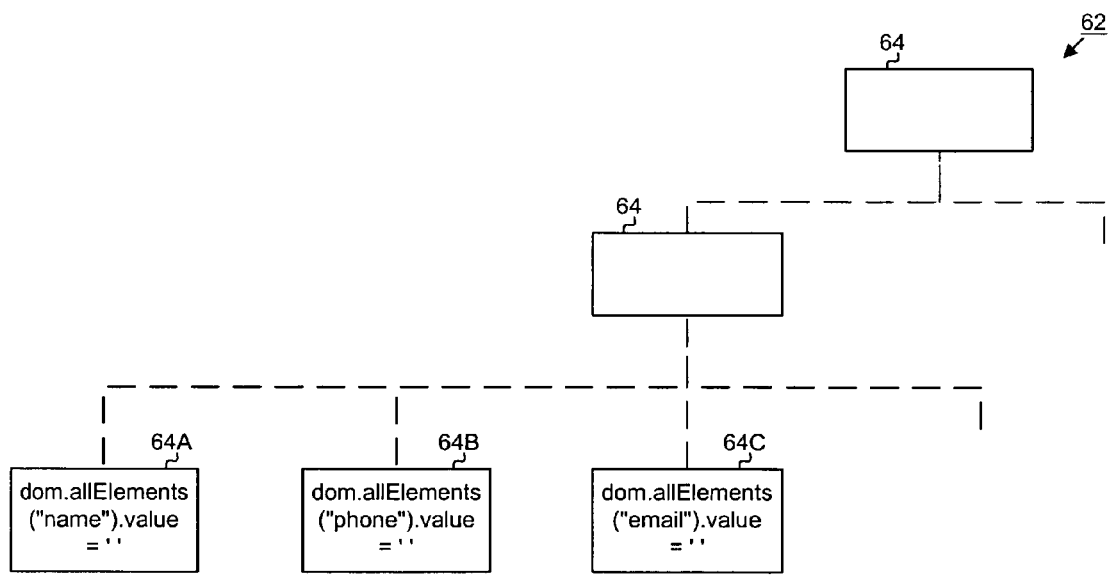
FIG. 9 is an illustration of a screen display generated by a Web browser according to an embodiment of the invention.
FIG. 10 is an illustration of a Document Object Model (DOM) according to an embodiment of the invention.

If displayed by a Web browser, the document 56 may appear as shown in FIG. 9. Visually, the displayed document 56 is very similar to that of FIG. 4, with the exception of the customized personal data. Thus, unlike the Web page 2 of FIG. 1, the document 56 of FIG. 8 may be effectively edited by an HTML editor, because all of the necessary HTML elements 6 are included. This is a great advantage to Web designers and HTML programmers, who need to edit a document that is as similar to the desired end product (i.e. FIG. 4) as possible.

After the document request is received 102, the method 100 may continue by parsing 104 the document 56 to generate therefrom a corresponding Document Object Model (DOM) 62. As noted, a DOM 62 is a tree-like, hierarchical data structure including one or more objects 64 that represent the HTML elements 6 of the document 56. FIG. 10 illustrates a portion of a simplified DOM 62 corresponding to the document 56 of FIG. 8.

After the document 56 is parsed 104, the method 100 may continue by identifying 106 a script file 68 corresponding to the document 56. In certain embodiments, a document 56 and a corresponding script file 68 may have identical or similar names, with the exception of a file extension or other delimiter. For example, if the requested document 56 is named "personalinfo.html," the corresponding script file 68 may be named "personalinfo.scr" or the like.

Figures 11, 12:
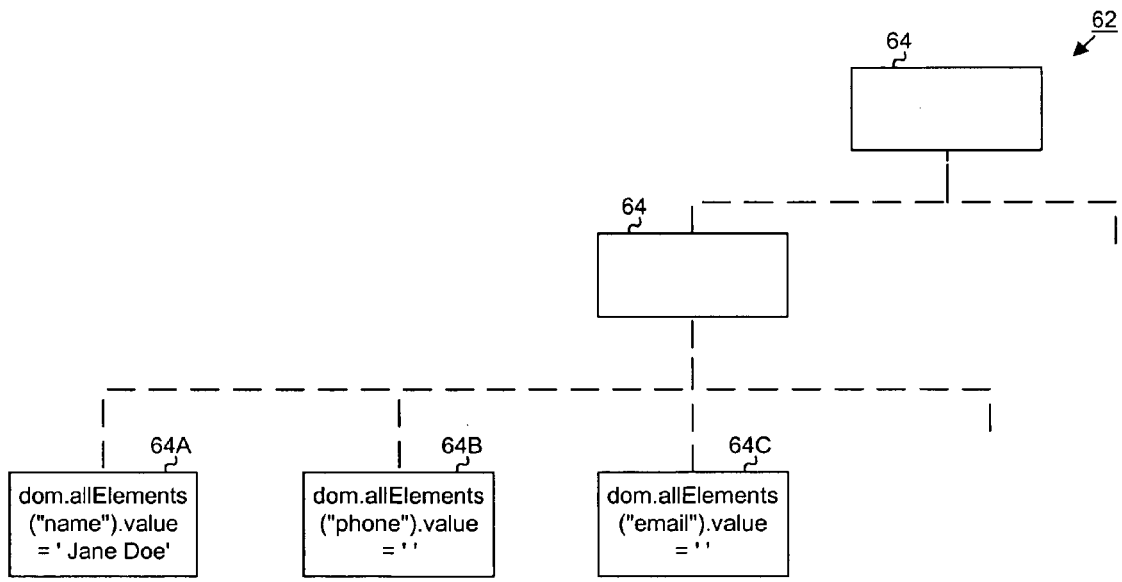
FIG. 11 is an illustration of a script file according to an embodiment of the invention.
FIG. 12 is an illustration of a DOM according to an embodiment of the invention.

FIG. 11 illustrates an exemplary script file 68 in accordance with an embodiment of the invention. As previously noted, a script file 68 may include one or more transformation instructions 72. Each transformation instruction may be directed to at least one object 64 of the DOM 62 and indicate at least one transformation to be performed on the at least one object 64.

While the script file 68 and the document 56 are depicted herein as logically separate data files, the script file 68 may be included, in some instances, within a separate portion of document 56. For example, all of the transformation instructions 72 of the script file 68 may be located, as a group, at the beginning of the document 56:

```
<%
dom.allElements("name").value = rs("name")
dom.allElements("phone").value = rs("phone")
dom.allElements("email").value = rs("email")
%>
<html>
<head>
<title>Personal Information Update</title>
</head>
<body>
<table>
    . . .
```

The location of the transformation instructions 72 within the document 56 is not crucial. However, all of the instructions 72 should be located together to avoid the noted drawbacks of conventional dynamic Web pages 2.

After the script file 68 is identified 106, the method 100 may continue by reading 108 a transformation instruction 72 from the script file 68. Thereafter, the method 100 may continue by transforming 110 one or more objects 64 of the DOM 62 in accordance with the read transformation instruction 72.

For example, if the first transformation instruction 72A is read, i.e. dom.allelements ("name").value 32 rs ("name"), the method 100 may proceed to transform the object 64A of FIG. 10 by querying a database 78 for a value, i.e. the user's name, and assigning the value to the object 64A. As previously noted, the "rs" (recordset) argument indicates a database query in one embodiment. If, for instance, the user's name is "Jane Doe," FIG. 12 illustrates the transformed object 64A within the DOM 62.

One advantage of transforming a DOM 62 rather than modifying an Web document 56, itself, as in conventional approaches, is that the DOM 62 is more easily transformed than HTML text. For example, any object 64 of the DOM 62 may be randomly accessed and transformed by a simple command, whereas modifying a Web document 56 requires more complex manipulations of the HTML text, such as cutting and pasting HTML elements 6.

After the transformation step 110 is complete, the method 100 may continue by determining 112 whether the script file 68 includes more transformation instructions 112. If so, the method may returns to step 108 to read the next instruction 72.

If, however, all of the instructions 72 have been used, the method 100 continues by flattening 114 the DOM 62 to create a transformed document 86. As previously noted, the flattening process involves converting the DOM 62 back into an HTML document 86. Consequently, any transformations to the DOM objects 64 will be preferably reflected in the corresponding HTML elements 6 of the document 86.

Figure 13:
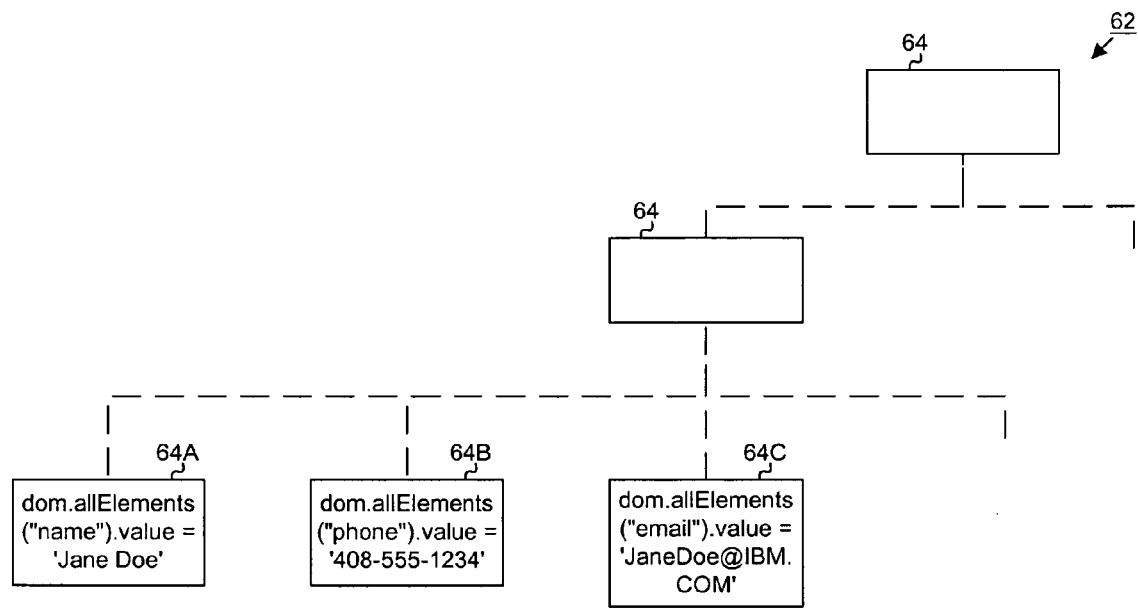

For example, FIG. 13 illustrates the DOM 62 after execution of the three transformations instructions 72A–C. After the flattening step 114, the transformed document 86 of FIG. 14 may result, which may then be sent 116 to the requesting Web browser 52 and displayed, as illustrated in FIG. 15.

Surprisingly, the transformed document 86 is identical to the modified document 8 of FIG. 3, which was produced by conventional techniques using embedded server-side scripts 4. However, the transformed document 86, in accordance with an embodiment of the invention, does not rely on embedded scripts 4. Rather, the transformed document 86 is generated, as noted above, by parsing a requested document 56 at the Web server 46, transforming the resulting DOM 62, and flattening the DOM 62 into a "transformed" HTML document 86.

Moreover, unlike conventional approaches, the transformation instructions 72 are not "place holders" for HTML elements 6 to be inserted later by a Web server 46. As such, all of the transformations instructions 72 can be located together, even within a separate script file 68.

Importantly, a document 56 in accordance with the present invention may be effectively edited by an HTML editor, since all of the HTML elements may be included within the document 56 at design time. Any transformations, such as assignments of values and the like, may be accomplished by transforming the DOM 62. No embedded scripts 4 are necessary.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Within a document server, a computer-implemented method for processing a request for a document comprising at least one hypertext markup language (HTML) element, the method comprising:
    parsing the requested document to generate therefrom a corresponding document object model (DOM) including at least one object;
    obtaining a transformation instruction directed to a first object of the DOM, the first object having a value;
    transforming the first object by changing the value thereof in accordance with the transformation instruction; and
    flattening the DOM to generate therefrom a corresponding transformed document.

2. The method of claim 1, wherein the obtaining step comprises:
    reading a transformation instruction from a script file corresponding to the requested document.

3. The method of claim 2, further comprising:
    receiving a request for a document from a client program; and
    identifying a script file within the document server corresponding to the requested document.

4. The method of claim 3, wherein the client program comprises a Web browser.

5. The method of claim 2, further comprising:
    receiving a request for a script file from a client program; and
    identifying a document within the document server corresponding to the requested script file.

6. The method of claim 2, wherein the script file is included within a separate portion of the document.

7. The method of claim 2, wherein the script file and the document comprise logically separate data files.

8. The method of claim 2, wherein the first object is an HTML file.

9. The method of claim 2, wherein the transformation instruction is read from a script file located separately from the first object.

10. The method of claim 2, wherein:
    the first object is an HTML file;
    the transformation instruction is read from a script file located separately from the HTML file; and
    the HTML file and the script file contain information to indicate their correspondence to each other.

11. The method of claim 1, further comprising:
    transmitting the transformed document to a client program.

12. The method of claim 1, wherein the transforming step comprises:
    retrieving a database value from a database; and
    assigning the database value to an object of the DOM.

13. The method of claim 1, wherein the transforming step comprises:
    replacing a first object of the DOM with a different second object.

14. The method of claim 1, wherein the document and the corresponding transformed document are in the same format.

15. The method of claim 14, wherein the same format is HTML.

16. The method of claim 1, wherein the value is changed in accordance with different users.

17. The method of claim 1, wherein the value is a variable.

18. The method of claim 1, wherein the value of the first object is empty before the first object is transformed.

19. A computer system including memory for processing a request for a document comprising at least one hypertext markup language (HTML) element, the system comprising:
    a parsing module configured to parse a requested document to generate therefrom a corresponding document object model (DOM) including at least one object;
    an instruction obtaining module configured to obtain a transformation instruction directed to a first object of the DOM, the first object having a value;
    an object transformation module configured to transform the first object by changing the value thereof in accordance with the transformation instruction;
    and a flattening module configured to flatten the DOM to generate therefrom a corresponding transformed document.

20. The system of claim 19, wherein the instruction module comprises:
    a script file access module configured to read a transformation instruction from a script file corresponding to the requested document.

21. The system of claim 20, further comprising:
a request reception module configured to receive a request for a document from a client program and identify a script file corresponding to the requested document.

22. The system of claim 21, wherein the client program comprises a Web browser.

23. The system of claim 20, further comprising:
a request reception module configured to receive a request for a script file from a client program and to identify a document corresponding to the requested script file.

24. The system of claim 20, wherein the script file is included within a separate portion of the document.

25. The system of claim 20, wherein the script file and the document comprise logically separate data files.

26. The system of claim 20, wherein the first object is an HTML file.

27. The system of claim 20, wherein the transformation instruction is read from a script file located separately from the first object.

28. The system of claim 20, wherein:
the first object is an HTML file;
the transformation instruction is read from a script file located separately from the HTML file; and
the HTML file and the script file contain information to indicate their correspondence to each other.

29. The system of claim 19, further comprising:
a transmission module configured to transmit the transformed document to a client program.

30. The system of claim 19, wherein the object transformation module comprises:
a database query module configured to retrieve a database value from a database; and
a value assignment module configured to assign the database value to an object of the DOM.

31. The system of claim 19, wherein the object transformation module comprises:
an element replacement module configured to replace a first object of the DOM with a different second object.

32. The system of claim 19, wherein the document and the corresponding transformed document are in the same format.

33. The method of claim 32, wherein the same format is HTML.

34. The method of claim 19, wherein the value is changed in accordance with different users.

35. The method of claim 19, wherein the value is a variable.

36. The method of claim 19, wherein the value of the first object is empty before the first object is transformed.

37. An article of manufacture comprising a program storage medium readable by a processor and embodying one or more instructions executable by the processor to perform a computer-implemented method for processing a request for a document comprising at least one hypertext markup language (HTML) element, the method comprising:
parsing the requested document to generate therefrom a corresponding document object model (DOM) including at least one object;
obtaining a transformation instruction directed to a first object of the DOM the first object having a value;
transforming the first object by changing the value thereof in accordance with the transformation instruction; and
flattening the DOM to generate therefrom a corresponding transformed document.

38. The article of manufacture of claim 37, wherein the obtaining step comprises:
reading a transformation instruction from a script file corresponding to the requested document.

39. The article of manufacture of claim 38, the method further comprising:
receiving a request for a document from a client program; and
identifying a script file corresponding to the requested document.

40. The article of manufacture of claim 39, wherein the client program comprises a Web browser.

41. The article of manufacture of claim 38, the method further comprising:
receiving a request for a script file from a client program; and
identifying a document corresponding to the requested script file.

42. The article of manufacture of claim 38, wherein the script file is included within a separate portion of the document.

43. The article of manufacture of claim 38, wherein the script file and the document comprise logically separate data files.

44. The article of manufacture of claim 38, wherein the first object is an HTML file.

45. The article of manufacture of claim 38, wherein the transformation instruction is read from a script file located separately from the first object.

46. The article of manufacture of claim 38, wherein:
the first object is an HTML file;
the transformation instruction is read from a script file located separately from the HTML file; and
the HTML file and the script file contain information to indicate their correspondence to each other.

47. The article of manufacture of claim 37, the method further comprising:
transmitting the transformed document to a client program.

48. The article of manufacture of claim 37, wherein the transforming step comprises:
retrieving a database value from a database; and
assigning the database value to an object of the DOM.

49. The article of manufacture of claim 37, wherein the transforming step comprises:
replacing a first object of the DOM with a different second object.

50. The article of manufacture of claim 37, wherein the document and the corresponding transformed document are in the same format.

51. The article of manufacture of claim 50, wherein the same format is HTML.

52. The article of manufacture of claim 37, wherein the value is changed in accordance with different users.

53. The article of manufacture of claim 37, wherein the value is a variable.

54. The article of manufacture of claim 37, wherein the value of the first object is empty before the first object is transformed.

\* \* \* \* \*